United States Patent [19]

Cody et al.

[11] Patent Number: 5,151,155
[45] Date of Patent: Sep. 29, 1992

[54] PROCESS FOR DEINKING WASTEPAPER WITH ORGANICALLY MODIFIED SMECTITE CLAY

[75] Inventors: Charles A. Cody, Robbinsville; Edward D. Magauran, Mount Holly, both of N.J.

[73] Assignee: Rheox, Inc., Hightstown, N.J.

[21] Appl. No.: 697,448

[22] Filed: May 9, 1991

[51] Int. Cl.$^5$ ............................................. D21C 5/02
[52] U.S. Cl. ............................................. 162/5; 162/8
[58] Field of Search ............... 162/8, 199, DIG. 4, 162/5

[56] References Cited

U.S. PATENT DOCUMENTS

| | | | |
|---|---|---|---|
| 1,421,195 | 6/1922 | Eyrich et al. | 162/8 |
| 1,659,401 | 2/1928 | Kirschbraun | 162/8 |
| 3,501,373 | 3/1970 | Illingworth | 162/5 |
| 3,801,433 | 4/1974 | Windle | 162/DIG. 4 |
| 3,932,206 | 1/1976 | Illingworth et al. | 162/5 |
| 4,013,505 | 3/1977 | Balcar et al. | 162/8 |
| 4,264,412 | 4/1981 | Hasler | 162/5 |
| 4,608,123 | 8/1986 | Leahy | 162/DIG. 4 |
| 4,618,400 | 10/1986 | Wood et al. | 162/5 |
| 4,666,558 | 5/1987 | Wood et al. | 162/5 |
| 4,680,088 | 7/1987 | Bastanzuri | 162/4 |
| 4,710,267 | 12/1987 | Elsby et al. | 162/8 |

FOREIGN PATENT DOCUMENTS

| | | | |
|---|---|---|---|
| 150191 | 8/1984 | Japan | 162/5 |
| 926129 | 5/1982 | U.S.S.R. | 162/5 |
| 1375161 | 11/1974 | United Kingdom | 162/DIG. 4 |

*Primary Examiner*—Karen M. Hastings
*Attorney, Agent, or Firm*—Roper & Quigg

[57] ABSTRACT

A process for deinking wastepaper with an aqueous system, which includes:

(a) contacting wastepaper with an aqueous system which contains an agent of one or more organically modified smectite-type clays; and (b) recovering deinked paper pulp from the aqueous system.

18 Claims, No Drawings

PROCESS FOR DEINKING WASTEPAPER WITH ORGANICALLY MODIFIED SMECTITE CLAY

BACKGROUND OF THE INVENTION

1 Field of the Invention

The present invention relates to a process for removing ink from wastepaper in order to provide paper pulp that may be reused to manufacture new paper. In particular, the invention is directed to a process for removing both water-based and oil-based inks from wastepaper by means of a novel group of deinking agents.

2. Description of the Prior Art

Recycled wastepaper has traditionally been a source of raw fiber materials needed in the papermaking industry. In the past, fiber from wastepaper was only employed in the production of low grade paper and paperboard products. Today, however, reclaimed fiber comprises about 25 percent of the total fiber used to manufacture paper, thereby providing an incentive for improving the utility of reclaimed paper pulp materials. In particular, recent efforts have attempted to develop techniques for effectively removing ink from waste fibers, in order to permit their use in the manufacture of high quality paper.

In conventional paper reclamation processes, deinking is carried out by converting the wastepaper to pulp and contacting the pulp with an alkaline aqueous deinking medium containing a chemical deinking agent, in order to remove ink and other impurities from the pulp fiber and produce a suspension or dispersion of the ink and other particles in the aqueous medium. The resulting mixture is subsequently treated to separate the suspended ink and other particles from the pulp, for example, by air sparging and floatation of the ink/deinking agent complex, followed by skimming to remove the ink and other particles from the treatment bath, or by filtration and subsequent water washing of the fiber mat to remove dispersed ink particles.

There have been numerous attempts in the prior art to improve the efficacy of conventional deinking processes. For example, U.S. Pat. No. 4,618,400 discloses a method for deinking wastepaper which involves converting the wastepaper to a pulp; contacting the pulp with an aqueous medium of alkaline pH containing about 0.2 to 2% by weight of a deinking agent which is one or a mixture of certain thiol ethoxylate compounds; and removing suspended or dispersed ink from the pulp-containing medium.

U.S. Pat. No. 4,666,558 illustrates a deinking process for waste newsprint, which involves contacting and agitating a pulped newsprint in an aqueous medium containing a deinking agent comprising a particular mixture of a water-soluble $C_9$ to $C_{16}$ alkanol ethoxylate component having an average of about 6.5 to 20 oxyethylene units per ethoxylate molecule and an oil-soluble $C_9$ to $C_{16}$ alkanol ethoxylate component having an average of about 0.5 to 3.5 oxyethylene units per ethoxylate molecule, and recovering deinked pulp from the aqueous medium.

U.S. Pat. No. 3,932,206 describes deinking agents which are said to be biodegradable and non-toxic to aquatic life; the disclosed compounds consist of ethoxylated aliphatic mono-or diols having from 14 to 30 carbon atoms in the aliphatic chain, and from 8 to 24 ethyleneoxy units per mole of the mono- or diol.

Despite the foregoing efforts, it is generally agreed that no completely acceptable process for deinking wastepaper presently exists. One shortcoming of many of the prior art deinking techniques is the inability of these processes to simultaneously remove both water-based and oil-based inks from the wastepaper. In this regard, substantial costs are associated with processing wastepaper materials to separate water-based ink containing materials from those which contain oil-based inks. Moreover, deinking agents utilized to date have bee ineffective in removing tacky contaminants from wastepaper. These tacky contaminants (from pressure sensitive labels, binding materials and glues) are frequently encountered in wastepaper deinking processes, and tend to limit the quality of the final recycled product.

It would therefore be highly desirable to provide a process for deinking various types of wastepaper which contain water-based and/or oil-based inks. In addition, it would be advantageous if such a deinking process could also remove tacky contaminants from the treated wastepaper, in order to enhance the quality of deinked paper pulp yielded by the process.

SUMMARY OF THE INVENTION

According to a first aspect of the present invention, a process for deinking wastepaper is provided, which comprises:

(a) contacting wastepaper with an aqueous system which contains an agent selected from the group consisting of:

(i) a mixture of one or more quaternary ammonium salts and one or more smectite-type clays; and (ii) one or more organically modified smectite-type clays; and (b) recovering deinked paper pulp from the aqueous system.

Quaternary ammonium salts which are useful in accordance with the invention include those having the formula:

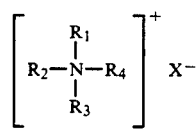

wherein $R_1$ comprises a lineal or branched aliphatic hydrocarbon group having from 1 to about 30 carbon atoms; $R_2$, $R_3$ and $R_4$ are independently selected from the group consisting of (a) lineal or branched aliphatic groups having from 1 to about 30 carbon atoms; (b) aromatic and substituted aromatic groups; (c) ethoxylated groups containing from 1 to about 80 moles of ethylene oxide; and (d) hydrogen; and $X^-$ comprises an anion, preferably chloride, bromide, iodide, hydroxyl, nitrite or acetate.

A preferred quaternary ammonium salt for purposes of the invention for use in a water washing deinking process comprises an ethoxylated quaternary ammonium salt that contains:

(a) at least one hydrocarbon chain having from about 8 to about 30 carbon atoms; and (b) at least one hydrophilic carbon chain having greater than about 9 moles of ethylene oxide.

A preferred quaternary ammonium salt for purposes of the invention for use in a floatation deinking process comprises a quaternary ammonium salt that contains:

(a) at least one, preferably two or three, hydrocarbon chains having from about 8 to about 30 carbon atoms; and (b) either no hydrophilic carbon chains or having hydrophilic carbon chains having a total of about 9 moles of ethylene oxide or less.

The novel deinking agents provided by the invention are generally used in amounts of from about 0.05% to about 50% by weight, based on the dry weight of the wastepaper treated.

The process of the invention is capable of simultaneously removing both water-based and oil-based inks from wastepaper pulp. Examples of types of wastepaper which may be treated in accordance with the invention include those selected from the group consisting of newspaper, magazines, computer paper, legal documents and book stock.

In order to facilitate ink removal from the wastepaper, the aqueous system is utilized to form a paper/water slurry, which slurry preferably has an alkaline pH. The aqueous system may include one or more foaming agents to enhance the deinking process. It will be understood that the wastepaper may be pulped prior to or after contact with the deinking additive.

The deinking process of the invention preferably operates in accordance with either floatation deinking techniques or water washing techniques both well-known in the art. For example, once the wastepaper has been formed into a slurry and contacted with a deinking agent provided by the invention, the slurry may be (1) subjected to air sparging in order to float flocculated ink removed from the wastepaper to the surface of the slurry, where it may be removed by skimming, or (2) treated to physically remove the relatively small amount of foamy ink waste which may collect on the surface (optional), filtered and the resulting fiber mat subjected to multiple water washings so that dispersed ink particles pass through the mat. Both floatation or water washing techniques, when followed in accordance with the novel process and agents of the invention, result in deinked paper pulp that is suitable for the manufacture of high quality recycled paper products.

When an organically modified smectite type clay is employed in the deinking compositions of the invention, the clay is preferably selected from the group consisting of crude hectorite, crude bentonite, beneficiated hectorite, beneficiated bentonite, spray dried hectorite and mixtures thereof. Other smectite-type clays known in the art may be utilized.

A preferred organically modified smectite-type clay for purposes of the instant invention comprises the reaction product of:

(a) a smectite-type clay having a cation exchange capacity of at least 50 milliequivalents per 100 grams of clay; and (b) one or more quaternary ammonium salts in an amount of from about 40% to about 200% of the cation exchange capacity of the smectite-type clay. In preparing the organically modified smectite-type clay, the smectite-type clay can be sheared prior to reaction with the quaternary ammonium salt.

The present invention contemplates both solid and aqueous slurry forms of organically modified smectite-type clays as deinking agents in the process of the invention. When aqueous slurry forms are employed, it has been found to be desirable to shear the slurry prior to adding the same to the aqueous system. Similarly, solid organically modified smectite-type clays are preferably pulverized prior to use as deinking agents in the process of the invention.

DESCRIPTION OF THE PREFERRED EMBODIMENTS

According to the present invention, Applicants have discovered a process for deinking wastepaper, which comprises:

(a) contacting wastepaper with an aqueous system which contains an agent selected from the group consisting of:
(i) a mixture of one or more quaternary ammonium salts and one or more smectite-type clays; and
(ii) one or more organically modified smectite-type clays; and (b) recovering deinked paper pulp from the aqueous system.

Useful quaternary ammonium salts for purposes of the subject invention include those having the formula:

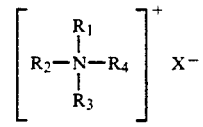

wherein $R_1$ comprises a lineal or branched aliphatic hydrocarbon group having from 1 to about 30 carbon atoms; $R_2$, $R_3$ and $R_4$ are independently selected from the group consisting of (a) lineal or branched aliphatic groups having from 1 to about 30 carbon atoms; (b) aromatic and substituted aromatic groups; (c) ethoxylated groups containing from 1 to about 80 moles of ethylene oxide; and (d) hydrogen. The anion $X^-$ which accompanies the quaternary ammonium salt is typically one that will not adversely affect the deinking activity of the salt. Such anions include, for example, chloride, bromide, iodide, hydroxyl, nitrite and acetate, used in an amount sufficient to satisfy the quaternary ammonium cation's charge.

The aliphatic groups in the above formula may be derived from naturally occurring oils including various vegetable oils, such as corn oil, coconut oil, soybean oil, cottonseed oil, castor oil and the like, as well as various animal oils or fats such as tallow oil. The aliphatic groups may likewise be petrochemically derived from, for example, alpha olefins.

Representative examples of useful branched, saturated radicals include 12-methylstearyl and 12-ethylstearyl. Representative examples of useful branched, unsaturated radicals include 12-methyloleyl and 12-ethyloleyl. Representative examples of unbranched, saturated radicals include lauryl; stearyl; tridecyl; myristyl (tetradecyl); pentadecyl; hexadecyl; hydrogenated tallow, docosanyl. Representative examples of unbranched, unsaturated and unsubstituted radicals include oleyl, linoleyl, linolenyl, soya and tallow.

Additional examples of useful aromatic groups, that is benzyl and substituted benzyl moieties, include materials derived from, e.g., benzyl halides, benzhydryl halides, trityl halides, α-halo-o-phenylalkanes wherein the alkyl chain has from 1 to 22 carbon atoms, such as 1-halo-1-phenylethane, 1-halo-1-phenylpropane, and 1-halo-1-phenyloctadecane; substituted benzyl moieties, such as those derived from ortho-, meta- and para-chlorobenzyl halides, para-methoxybenzyl halides, ortho-, meta- and para-nitrilobenzyl halides, and ortho-, meta- and para-alkylbenzyl halides wherein the alkyl chain contains from 1 to 22 carbon atoms; and fused ring benzyl-type moieties, such as those derived from 2-halomethylnaphthalene, 9-halomethylanthracene and 9-halomethylphenathrene, wherein the halo group comprises chloro, bromo, iodo, or any other such group which serves as a leaving group in the nucleophilic attack of the benzyl type moiety such that the nucleophile replaces the leaving group on the benzyl type moiety.

Additional useful aromatic-type substituents include phenyl and substituted phenyl, N-alkyl and N,N-dialkyl anilines, wherein the alkyl groups contain between 1 and 22 carbon atoms; ortho-, meta- and para-nitrophenyl, ortho-, meta- and para-alkyl phenyl, wherein the alkyl group contains between 1 and 22 carbon atoms, 2-, 3-, and 4-halophenyl wherein the halo group is defined as chloro, bromo, or iodo, and 2-, 3-, and 4-carboxyphenyl and esters thereof, where the alcohol of the ester is derived from an alkyl alcohol, wherein the alkyl group contains between 1 and 22 carbon atoms, aryl such as phenol, or aralkyl such as benzyl alcohols; and fused ring aryl moieties such as naphthalene, anthracene, and phenanthrene.

Useful quaternary ammonium salts for purposes of the instant invention include hydrophobic quaternary ammonium salts, such as monomethyl trialkyl quaternaries and dimethyl dialkyl quaternaries, as well as hydrophilic quaternary ammonium salts, such as water-dispersible, ethoxylated quaternary ammonium compounds, and mixtures thereof.

In particular, a preferred hydrophilic quaternary ammonium salt for use in the deinking formulations of the invention for use in water washing deinking processes comprises an ethoxylated quaternary ammonium salt that contains:

(a) at least one hydrocarbon chain having from about 8 to about 30 carbon atoms; and (b) at least one hydrophilic carbon chain having greater than about 9 moles of ethylene oxide.

Examples of suitable ethoxylated quaternary ammonium compounds include the following:

Dihydrogenated tallow-methyl-[ethoxylated (33)] ammonium chloride:

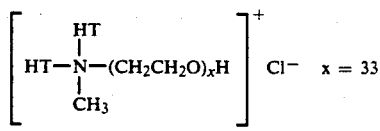

Hydrogenated tallow-methyl-[ethoxylated (15)] ammonium chloride:

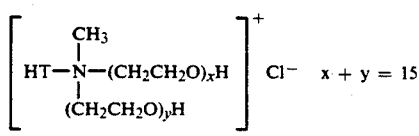

Hydrogenated tallow-methyl-[ethoxylated (50)] ammonium

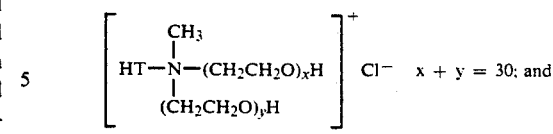

Hydrogenated tallow-methyl-[ethoxylated (50)] ammonium chloride:

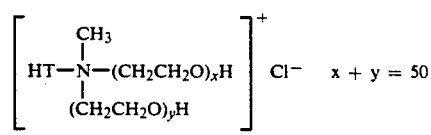

wherein HT=hydrogenated tallow.

A preferred hydrophobic quaternary ammonium salt for use in the deinking formulations of the invention, for use in floatation deinking processes, comprises a quaternary ammonium salt that contains:

(a) at least one, preferably two or three, hydrocarbon chains having from about 8 to 30 carbon atoms; and (b) either no hydrophilic carbon chains or having hydrophilic carbon chains having a total of about 9 moles of ethylene oxide or less.

Examples of suitable hydrophobic quaternary ammonium compounds include the following:

Methyl trihydrogenated tallow ammonium chloride:

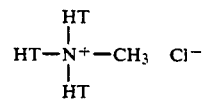

Dimethyl dihydrogenated tallow ammonium chloride:

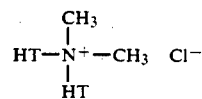

Dimethyl dibehenyl ammonium chloride:

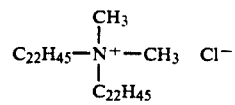

wherein HT=hydrogenated tallow.

It should be understood that either a mixture of hydrophobic organically modified clay and hydrophilic organically modified clay, or an organically modified clay in which the quaternary ammonium salt provided the resultant organoclay with the proper hydrophilic/hydrophobic balance, could be employed in deinking processes that employ a combination of floatation and water washing techniques to produce deinked pulp. Thus, an organoclay made from two different quaternary ammonium salts varying in their hydrophobic properties would be within the teachings of the invention. In this regard, quaternary ammonium salts having both hydrophobic and hydrophilic groups may be employed.

The preparation of the quaternary ammonium compounds utilized in the inventive deinking formulations can be carried out by techniques well-known in the art. For example, when preparing a quaternary ammonium salt, one skilled in the art would prepare a dialkyl secondary amine, for example, by the hydrogenation of nitriles (see U.S. Pat. No. 2,355,356), and then form the methyl dialkyl tertiary amine by reductive alkylations using formaldehyde as a source of the methyl radical. According to procedures set forth in U.S. Pat. No. 3,136,819 and U.S. Pat. No. 2,775,617, a quaternary amine halide may then be formed by adding benzyl chloride or benzyl bromide to the tertiary amine. The disclosure of the above three patents are incorporated herein by reference.

As is well-known in the art, the reaction of the tertiary amine with benzyl chloride or benzyl bromide may be completed by adding a minor amount of methylene chloride to the reaction mixture s that a blend of products which are predominantly benzyl substituted is obtained. This blend may then be used without further separation of components. The quaternary ammonium salt may be used as a deinking agent in admixture with a smectite-type clay, or it may be reacted with the clay to form an organically modified smectite-type clay deinking agent.

Likewise, smectite-type clays may be employed as deinking agents in accordance with the invention in admixture with a quaternary ammonium salt. Also, organically modified smectite-type clays may be used as deinking agents.

The clays which may be used in the present invention are smectite-type clays having a cationic exchange capacity of at least 50 milliequivalents per 100 grams of clay, as determined by the well-known ammonium acetate method.

Smectite-type clays are well-known in the art and are commercially available from a variety of sources. Prior to use in the deinking formulations of the invention, the clays can be converted to the sodium form if they are not already in this form. This may be conveniently carried out by preparing an aqueous clay slurry and passing the slurry through a bed of cation exchange resin in the sodium form. Alternatively, the clay can be mixed with water and a soluble sodium compound, such as sodium carbonate, sodium hydroxide, etc., and the mixture sheared, such as with a pugmill or extruder. Conversion of the clay to the sodium form can be undertaken at any point before use as a deinking agent, in either organically modified or unmodified forms.

Smectite-type clays prepared synthetically by either a pneumatolytic or, preferably, a hydrothermal synthesis process may also be used to prepare the novel deinking agents of the invention.

Representative smectite-type clays useful in accordance with the present invention are the following:

Montmorillonite $$[Al_{4-x}Mg_xSi_8O_{20}(OH)_{4-f}F_f]XR^+$$

where $0.55 \leq X \leq 1.10$, $f \leq 4$ and R is selected from the group consisting of Na, Li, N$_4$, and mixtures thereof;

Bentonite $$[Al_{4-x}Mg_x(Si_{8-y}Al_y)O_{20}(OH)_{4-f}F_f](x+y)R^+$$

where $0 < X < 1.10$, $0 < y < 1.10$, $0.55 \leq (x+y) \leq 1.10$, $f \leq 4$ and R is selected from the group consisting of Na, Li, NH$_4$ and mixtures thereof;

Beidellite $$[Al_{4+y}(Si_{8-x-y}Al_{x-y})O_{20}(OH)_{4-f}F_f]XR^+$$

where $0.55 \leq X \leq 1.10$, $0 \leq y \leq 0.44$, $f \leq 4$ and R is selected from the group consisting of Na, Li, NH$_4$ and mixtures thereof;

Hectorite $$[Mg_{6-x}Li_xSi_8O_{20}(OH)_{4-f}F_f]XR^+$$

where $0.57 \leq X \leq 1.15$, $f \leq 4$ and R is selected from the group consisting of Na, Li, N$_4$, and mixtures thereof;

Saponite $$[Mg_{6-y}Al_ySi_{8-x-y}Al_{x+y}O_{20}(OH)_{4-f}F_f]XR^+$$

where $0.58 \leq X \leq 1.18$, $0 \leq y \leq 0.66$, $f \leq 4$ and R is selected from the group consisting of Na, Li, NH$_4$, and mixtures thereof; and Stevensite $$[Mg_{6-x}Si_8O_{20}(OH)_{4-f}F_f]2xR^+$$

where $0.28 \leq X \leq 0.57$, $f = 4$ and R is selected from the group consisting of Na, Li, N$_4$, and mixtures thereof.

The preferred clays used in the present invention are bentonite and hectorite. It will be understood that both sheared and non-sheared forms of the above-listed smectite clays may be employed. In addition, the smectite clay employed can be either crude (containing gangue or non-clay material) or beneficiated (gangue removed). The ability to use crude clay in the smectite-type clay containing deinking compositions of this invention represents a substantial cost savings, since the clay beneficiation process and conversion to the sodium form do not have to be carried out.

The smectite-type clays may be synthesized hydrothermally by forming an aqueous reaction mixture in the form of a slurry containing mixed hydrous oxides or hydroxides of the desired metals with or without sodium (or alternate exchangeable cation or mixture thereof) and fluoride in the proportions defined by the above formulas and the preselected values of x, y and f for the particular synthetic smectite desired. The slurry is then placed in an autoclave and heated under autogenous pressure to a temperature within the range of approximately 100° to 325° C., preferably 275° to 300° C., for a sufficient period of time to form the desired product. Formulation times of 3 to 48 hours are typical at 300° C. depending upon the particular smectite-type clay being synthesized; the optimum time can be readily determined by pilot trials.

Representative hydrothermal processes for preparing synthetic smectite clays are described in U.S. Pat. Nos. 3,252,757; 3,586,478; 3,666,407; 3,671,190; 3,844,978; 3,844,979; 3,852,405 and 3,855,147, all of which are incorporated herein by reference.

The deinking process provided by the invention may utilize an organically modified smectite-type clay in the dry form as the deinking agent. Both hydrophilic and hydrophobic organically modified smectite-type clays have been found to be useful as wastepaper deinking agents according to the present invention. Typically, relatively hydrophilic organoclays will find their greater utility in deinking systems which employ water washing to remove ink. Relatively hydrophobic organoclays will find their greatest utility in deinking systems that employ floatation. The organoclay deinking agent can be prepared by admixing a smectite-type clay, one or more organic salts and water together, preferably at temperatures with the range of from 20° C. to 100° C., and most preferably from 35° C. to 80° C., for a period of time sufficient for the organic compound to react with the clay. The reaction is followed by filtering, washing, drying and grinding the organoclay product. When in slurry form, the organoclay product does not need to be filtered, washed, dried or ground.

The clay is preferably dispersed in water at a concentration of from about 1 to 80%, most preferably from about 2 to 8% by weight. Optionally, the slurry may be centrifuged to remove non-clay impurities which constitute about 10% to 50% of the starting clay composition.

A preferred organically modified smectite-type clay comprises the reaction product of:

(a) a smectite-type clay having a cation exchange capacity of at least 50 milliequivalents per 100 grams of clay; and (b) one or more quaternary ammonium salts in an amount of from about 40% to about 200% of the cation exchange capacity of the smectite-type clay. Shearing the smectite-type clay prior to reaction with the quaternary ammonium salt has been found to increase the deinking ability of the resulting organoclay.

The organically modified smectite-type clay may be provided in either solid or aqueous slurry form. The efficacy of aqueous slurry organoclays has been found to be improved if the organoclay is sheared prior to addition to the aqueous treating bath. Likewise, pulverizing solid organoclays before employing them as deinking agents has been found to improve the deinking process.

The deinking agents employed in the process of the invention are used in amounts of from about 0.05% to about 50% by weight, based on the dry weight of the wastepaper treated.

When the inventive technique is carried out as a floatation process, the deinking agents remove the ink from the wastepaper by flocculation, followed by floatation and skimming of the ink, deinking agent and tacky contaminants to remove the same from the aqueous slurry. The operation is preferably carried out under alkaline conditions. If desired, the slurry may be subjected to air sparging in order to assist in the floatation of ink removed from the wastepaper to the surface of the slurry. The aqueous system may include one or more foaming agents, such as soaps or detergents, in order to yield enhanced deinking performance.

When the inventive technique is carried out as a water washing process the deinking agents function to disperse the ink particles to a size small enough so that on filtration the ink particles, deinking agent and tacky contaminants can be removed by rinsing through the fiber mat. The operation is preferably carried out under alkaline conditions.

The process of the invention is effective for deinking wastepaper containing both water-based and oil-based inks. Exemplary types of wastepaper which may be treated according to the invention are newspaper, magazines, computer paper, legal documents and book stock. If desired, the wastepaper may be pulped prior or after addition of the deinking agent, in order to increase the surface area of the wastepaper in contact with the deinking agents of the invention. Techniques and apparatus for pulping wastepaper are well-known to those having ordinary skill in the art. For example, the wastepaper may be pulped after addition to the aqueous system by subjecting the system to shear.

The process of the invention provides an effective mean for deinking wastepaper containing water-based or oil-based inks. The inventive process results in deinked paper pulp that is suitable for the manufacture of high quality recycle paper products. In addition, the deinked paper pulp yielded by the invention contains fewer tacky contaminants than the products of conventional deinking techniques.

The following examples are given to illustrate the invention, but are not deemed to be limiting thereof. All percentages given throughout the specification are based upon weight, 100% weight basis, unless otherwise indicated.

EXAMPLE 1

This example describes the preparation of a preferred organoclay deinking composition according to the invention for use in a floatation deinking process, based on a reaction product of crude hectorite clay and quaternary ammonium salt.

366.3 grams of a 5.46% solids crude hectorite clay slurry (20 grams of crude clay solids) sheared using a Tekmar SD-45 disperser was weighed into a 1.2 liter stainless steel reaction vessel, diluted with 150.0 grams of water and heated to 65° C. 70 milliequivalents (8.82 grams) of 91.7% active dimethyl dihydrogenated tallow ammonium chloride was melted and poured into the clay slurry. 65.1 grams of hot water was employed to rinse the quaternary ammonium salt into the clay slurry. The resulting mixture was stirred for 30 minutes at 65° C., cooled, sheared for 10 seconds to break up agglomerates and analyzed for percent solids. Percent solids was found to be equal 5.1%.

EXAMPLE 2

This example describes the floatation deinking procedure followed for evaluating the effectiveness of the deinking agent prepared in Example 1, and those of Examples 3–7 below, in deinking waste newsprint to yield recycled paper of enhanced brightness.

5.6 grams of newspaper (Trentonian), cut into small (~½ square inch) pieces, was added to 500 milliliters of water heated to 45° C. and adjusted to a pH of 9.5 with 1.0 milliliter of 10% sodium hydroxide solution. The aqueous slurry of newspaper was allowed to mix under low agitation for 10 minutes. The waste newspaper was then defibered by mixing for 3 minutes using a Cowles high speed dispersator at 2500 rpm. A portion of the organoclay slurry deinking agent prepared in Example 1 containing 1.5 grams of organoclay solids was then added to the defibered newspaper and thoroughly mixed. The defibered newspaper/organoclay mixture was then subjected to air sparging in order to float the flocculated ink waste. A floating ink floc was produced; it was removed by suction.

After air sparging and removal of the floated floc for a period of 10 minutes, the deinked paper pulp was recovered and acidified to a pH of 4.5 with sulfuric acid. The deinked paper pulp was then vacuum filtered and deposited onto a plastic sheet, covered with two filter paper blotters, onto which another plastic sheet was placed. The paper pulp was subjected to a pressure of 1 ton in a press for 90 seconds. The pressed sheet was removed from the press; the filter paper blotters were removed, and the pressed sheet was allowed to air dry overnight. After drying, the pressed sheet was tested using a Hunterlab Model D-25 Optical Sensor to measure blue reflectance, which was employed as an indicator of paper brightness.

EXAMPLE 3

The organoclay deinking agent described in Example 1 was evaluated according to the floatation deinking procedure described in Example 2. For comparison, a Blank was also run. For the Blank, the procedure described in Example 2 was followed, except that no organoclay deinking agent was added. Data are presented below.

| Sample | Brightness Value | Δ |
| --- | --- | --- |
| Blank-No Deinking Agent | 52.75 | — |
| Example 1 | 60.13 | 7.38 |

Data indicate that employing an organoclay of this invention as a deinking agent in a floatation deinking process yields recycled paper of considerably greater brightness than that obtained for the Blank.

EXAMPLE 4

This example describes the preparation of a preferred organoclay floatation deinking agent composed of an ethoxylated quaternary ammonium salt reacted with crude hectorite clay.

366.3 grams of 5.46% solids crude hectorite clay slurry (20 grams of crude clay solids) sheared using a Tekmar SD-45 disperser was weighed into a 1.2 liter stainless steel reaction vessel, diluted with 150.0 grams of water and heated to 65° C. 55 milliequivalents (12.33 grams) of 76.5% active methyl dihydrogenated tallow [ethoxylated (7)] ammonium chloride was melted and poured into the clay slurry. 65.1 grams of hot water was used to rinse the quaternary ammonium salt into the clay slurry. The mixture was stirred for 30 minutes at 65° C., cooled, sheared for 10 seconds to break up agglomerates and analyzed for percent solids. Percent solids was determined to be 5.40%.

EXAMPLE 5

The organoclay deinking agent prepared in Example 4 was evaluated according to the floatation deinking procedure described in Example 2. Brightness data obtained versus the Blank are presented below.

| Sample | Brightness Value | Δ |
| --- | --- | --- |
| Blank-No Deinking Agent | 52.80 | — |
| Example 4 | 59.40 | 6.60 |

Data indicate greater recycled paper brightness compared to the Blank for organoclay deinking agents of this invention employed in a floatation deinking process.

EXAMPLE 6

This example describes the preparation of a preferred organoclay floatation deinking composition based on a reaction product of bentonite clay and a quaternary ammonium salt.

740.7 grams of 2.70% solids beneficiated bentonite clay slurry (20 grams clay solids) sheared one pass at 4500 psi using a Manton-Gaulin model 15 MR homogenizer was weighed into a 3 liter stainless steel vessel and heated to 65° C. 150 milliequivalents (18.90 grams) of 91.7% active dimethyl dihydrogenated tallow ammonium chloride was melted and poured into the clay slurry. 50 grams of hot water was used to rinse the quaternary ammonium salt into the clay slurry. The mixture was stirred for 30 minutes at 65° C., cooled, sheared for 10 seconds to break up agglomerates and analyzed for percent solids. Percent solids was found to equal 4.77%.

EXAMPLE 7

The organoclay described in Example 6 was evaluated according to the floatation deinking procedure described in Example 2. Brightness data obtained versus the Blank are presented below.

| Sample | Brightness Value | Δ |
| --- | --- | --- |
| Blank-No Deinking Agent | 53.89 | — |
| Example 6 | 62.28 | 8.39 |

This example demonstrates that enhanced paper brightness can be achieved when a waste newspaper is treated with an organoclay floatation deinking agent of this invention based on bentonite clay that has been sheared.

EXAMPLE 8

This example describes the preparation of a series of water-dispersible organoclay deinking agents composed of octadecyl-methyl-[ethoxylated (15)] ammonium chloride reacted with crude hectorite clay (~55% clay, 45% gangue) in which the milliequivalents of quaternary ammonium salt were varied.

356.5 grams of a 5.6% solids crude hectorite clay slurry (20 grams crude clay solids) sheared using a Tekmar SD-45 disperser was weighed into a 1.2 liter stainless steel reaction vessel, diluted with 164.9 grams of water and heated to 65° C. The following milliequivalents of 97% active octadecyl-methyl-[ethoxylated (15)] ammonium chloride were heated and poured into charges of crude clay slurry: (a) 40 m.e. (8.19 g), (b) 55 m.e. (11.26 g), (c) 70 m.e. (14.34 g), (d) 85 m.e. (17.41 g) and (e) 100 m.e. (20.48 g). 50 milliliters of hot water was used to rinse each of the quaternary ammonium salts into the clay slurry. The mixtures were stirred for 30 minutes at 65° C., cooled, sheared for 10 seconds to break up agglomerates and analyzed for percent solids. Percent solids values for each of the above deinking agents were as follows: (a) 5.16%, (b) 5.40% (c) 6.14%, (d) 6.37% and (e) 7.19%.

EXAMPLE 9

This example delineates the water washing deinking procedure followed to evaluate the effectiveness of the deinking agents described in Example 8, and those of subsequent Examples 10-14 below, in deinking waste newsprint to yield recycled paper of enhanced brightness.

An amount of organoclay slurry containing 0.04 grams of organoclay solids was added to 375 milliliters of water heated to 50°-55° C. and adjusted to a pH of 9.5 with 1.0 milliliter of 10% sodium hydroxide solution. 4.0 grams of shredded newspaper was added to the bath and allowed to mix under low agitation for 10 minutes. The waste newspaper was then defibered by mixing for 3 minutes using a Cowles high speed dispersator at 2500 rpm. Next, the slurry was diluted with water to a volume of 1000 milliliters, and the pulp dewatered by draining on a 200 mesh sieve after a small amount of the foamy deinked floc floating on the surface was removed by aspiration. The pulp was stirred into 1000 milliliters of fresh water, and dewatered again by draining on a 200 mesh sieve; this procedure was then repeated one more time. The pulp was diluted with 1000 milliliters of water and vacuum filtered.

The resulting paper pulp mat was deposited onto a plastic sheet, covered with two filter paper blotters, onto which another plastic sheet was placed. The paper pulp was then subjected to a pressure of 1 ton in a press for 90 seconds. The pressed sheet was removed from the press; the filter paper blotters were removed and the pressed sheet was folded in half and allowed to air dry overnight. After drying, the pressed sheet was tested using a Hunterlab Model D-25 Optical Sensor to measure blue reflectance, which was employed as an indicator of paper brightness.

EXAMPLE 10

The water-dispersible organoclay deinking agents described in Example 8 were evaluated according to the water washing deinking procedure described in Example 9. Data are presented below.

| Sample | Brightness Value | Δ |
| --- | --- | --- |
| Blank-No Deinking Agent | 60.75 | — |
| Example 8(a) | 62.13 | +1.38 |
| Example 8(b) | 62.89 | +2.14 |
| Example 8(c) | 63.09 | +2.34 |
| Example 8(d) | 62.77 | +2.02 |
| Example 8(e) | 62.83 | +2.08 |

Data indicate that all organoclay deinking agents provided greater paper brightness than the Blank. Organoclays composed of 55 m.e. to 100 m.e. of octadecyl methyl-[ethoxylated (15)] ammonium chloride provide similar levels of paper brightness. Organoclay deinking agents composed of less than 55 m.e. of the ethoxylated quaternary ammonium salt did not appear to function as effectively.

EXAMPLE 11

This example describes the preparation of a series of water-dispersible organoclay deinking agents composed of crude hectorite clay reacted with 70 m.e. of various types of ethoxylated quaternary ammonium salts in which (1) the number of moles of ethylene oxide and (2) the number of hydrogenated tallow chains, were varied.

283.0 grams of a 5.30% solids sheared crude hectorite clay slurry (15 grams of crude clay solids) was weighed into a 1.2 liter stainless steel reaction vessel, diluted with 120 milliliters of water and heated to 65° C. 70 milliequivalents of the following ethoxylated quaternary ammonium salts were heated and poured into charges of crude clay slurry: (a) 76.0% active dihydrogenated tallow-methyl-[ethoxylated (2)] ammonium chloride (8.39 g), (b) 76.5% active dihydrogenated tallow-methyl-[ethoxylated (7)]ammonium chloride (11.77 g), (c) 77.1% active dihydrogenated tallow-methyl-[ethoxylated (16)] ammonium chloride (17.20 g), (d) 78.5% active dihydrogenated tallow-methyl-[ethoxylated (33)] ammonium chloride (26.93 g), (e) 75.4% active dihydrogenated tallow-methyl-[ethoxylated (50)] ammonium chloride (41.58 g) and (f) 75.1% active hydrogenated tallow-methyl-[ethoxylated (15)] ammonium chloride (13.75 g).

Additionally, 291.3 grams of 5.15% solids sheared crude hectorite clay slurry (15 grams of crude clay solids) was weighed into a 1.2 liter stainless steel reaction vessel, diluted with 110 milliliters of water and heated to 65° C. 70 milliequivalents of the following ethoxylated quaternary ammonium salts were heated and poured into charges of crude clay slurry: (g) 75.8% active hydrogenated tallow-methyl-[ethoxylated (7)] ammonium chloride (8.57 g), (h) 75.3% active hydrogenated tallow-methyl-[ethoxylated (30)] ammonium chloride (22.72 g) and (i) 74.9% active hydrogenated tallow-methyl-[ethoxylated (50)] ammonium chloride (35.20 g). All organoclays were reacted for 30 minutes at 65° C., cooled, sheared for 10 seconds, and the percent solids of each sample determined.

EXAMPLE 12

The water-dispersible organoclay deinking agents prepared in Example 11 were evaluated according to the water washing deinking procedure described in Example 9. Data are presented below.

| Sample | Brightness Value | Δ |
| --- | --- | --- |
| Blank-No Deinking Agent | 62.02 | — |
| Example 11(a) | 60.57 | −1.45 |
| Example 11(b) | 60.73 | −1.29 |
| Example 11(c) | 61.50 | −0.52 |
| Example 11(d) | 64.37 | +2.35 |
| Example 11(e) | 60.92 | −1.10 |
| Example 11(f) | 63.71 | +1.69 |
| Example 11(g) | 61.93 | −0.09 |
| Example 11(h) | 63.24 | +1.22 |
| Example 11(i) | 62.81 | +0.79 |

Data indicate an increased level of brightness for newspaper treated with organoclay water washing deinking agents composed of quaternary ammonium salts with one hydrogenated tallow chain and 15-50 moles of ethylene oxide. A significant increase in brightness was also obtained for organoclay water washing deinking agents composed of a quaternary ammonium salt with two hydrogenated tallow chains and 33 moles of ethylene oxide.

EXAMPLE 13

This example describes the preparation of a water-dispersible organoclay deinking agent according to the invention.

1388.9 grams of a 2.88% solids Manton-Gaulin sheared bentonite clay slurry (40 grams clay solids) was weighed into a 3 liter stainless steel reaction vessel, diluted with 150 milliliters of water and heated to 65° C. 135 m.e. of 97% active octadecyl-methyl-[ethoxylated (15)] ammonium chloride (55.29 g) was heated and poured into the clay slurry. The organoclay was reacted 30 minutes at 65° C., cooled, and sheared for 10 seconds. The percent solids in the composition was determined.

EXAMPLE 14

The organoclay deinking agent prepared in Example 13 was evaluated according to the water washing deinking procedure described in Example 9. Data are presented below.

| Sample | Brightness Value | Δ |
| --- | --- | --- |
| Example 13 | 53.51 | +1.62 |
| Blank | 51.89 | — |

This example demonstrates that enhanced paper brightness can be achieved when a waste newsprint is treated with a water-dispersible organoclay deinking agent based on the reaction product of bentonite and a quaternary ammonium salt.

EXAMPLE 15

The purpose of this example was to evaluate the effect an organoclay deinking composition has on sticky adhesive materials used on self sticking labels.

1.25 gram charges of self-sticking labels were cut into approximately one-inch squares and separately added to Samples 1 and 2 below:

Sample 1

125 grams of water, 0.25 grams of a 10% sodium hydroxide solution, and 9.4 grams of a deinking agent comprising a reaction product of 150 m.e. methyl trihydrogenated tallow ammonium chloride and bentonite clay (5.30% solids - 0.5 grams solids).

Sample 2

125 grams of water and 0.25 grams of a 10% sodium hydroxide solution (Blank).

The resulting slurries were mixed for 10 minutes at 1500-2000 r.p.m. using a Cowler dispersator. The following observations were made:

Sample (1) with organoclay eliminated the stickiness of the labels. Labels did not stick to each other, allowing easy disintegration of the paper labels.

Sample (2) (Blank) labels retained stickiness and stuck to each other, forming a single mass which was difficult to disintegrate.

The foregoing example demonstrates the ability of the compositions of this invention to eliminate the stickiness of tacky contaminants present in pulped wastepaper.

EXAMPLE 16

This example describes the preparation of a most preferred organoclay deinking composition according to the invention for use in a floatation deinking process, based on a reaction product of crude hectorite clay and quaternary ammonium salt.

185.9 grams of a 10.76% solids crude hectorite clay slurry (20 grams of crude clay solids) sheared using a Tekmar SD-45 disperser was weighed into a 1.2 liter stainless steel reaction vessel, diluted with 75 milliliters of water and heated to 65° C. 85 milliequivalents (17.32 g) of 77.5% active methyl trihydrogenated tallow ammonium chloride was melted and poured into the clay slurry. 25 milliliters of hot water was employed to rinse the quaternary ammonium salt into the clay slurry. The resulting mixture wa stirred for 30 minutes at 65° C., cooled, sheared for 15 seconds to break up agglomerates and analyzed for percent solids. Percent solids was found to equal 14.37%.

EXAMPLE 17

This example describes the floatation deinking procedure followed for evaluating the effectiveness of the deinking agent prepared in Example 16 in deinking waste newsprint to yield recycled paper of enhanced brightness.

A portion of the organoclay slurry deinking agent prepared in Example 16 containing 0.5 grams of organoclay solids was added to 500 milliliters of water heated to 45° C. and adjusted to a pH of 9.5 with 1.0 milliliter of 10% sodium hydroxide solution. 5.6 grams of newspaper (Trentonian), cut into small (~½ square inch) pieces, was added to the aqueous slurry and allowed to mix under low agitation for 10 minutes. The waste newspaper was then defibered by mixing for 3 minutes using a Cowles high speed dispersator at 2500 r.p.m. The defibered newspaper/organoclay mixture was then subjected to air sparging in order to float the flocculated ink waste. A floating ink floc was produced; it was removed by suction.

After air sparging and removal of the floated floc for a period of 15 minutes, the deinked paper pulp was recovered and acidified to a pH of 4.5 with sulfuric acid. The deinked paper pulp was then vacuum filtered and deposited onto a plastic sheet, covered with two filter paper blotters, onto which another plastic sheet was placed. The paper pulp was subjected to a pressure of 1 ton in a press for 90 seconds. The pressed sheet was removed from the press; the filter paper blotters were removed, and the pressed sheet was allowed to air dry overnight. After drying, the pressed sheet was tested using a Hunterlab Model D-25 Optical Sensor to measure blue reflectance, which was employed as an indicator of paper brightness.

For comparison, a Blank was also run. For the Blank, the procedure described above was followed, except that no organoclay deinking agent was added. Data are presented below.

| Sample | Brightness Value | Δ |
| --- | --- | --- |
| Blank-No Deinking Agent | 51.40 | — |
| Example 16 | 57.06 | 5.66 |

Data indicate greater recycled paper brightness compared to the Blank for organoclay deinking agents of this invention employed in a floatation deinking process.

The invention thus being described, it will be obvious that the same may be varied in many ways. Such variations are not to be regarded as a departure from the spirit and scope of the invention and all such modifications ar intended to be included within the scope of the claims.

What is claimed is:

1. A process for deinking wastepaper, which comprises:
   (a) contacting wastepaper with an aqueous system which contains an agent in an amount effective to deink the wastepaper, wherein the agent comprises: one or more organically modified smectite-type clays; and
   (b) recovering deinked paper pulp from the aqueous system.

2. The process of claim 1, wherein said agent is present in an amount of from about 0.05% to about 50% by weight, based on the dry weight of said wastepaper.

3. The process of claim 1, wherein said wastepaper is selected from the group consisting of newspaper, magazines, computer paper, legal documents and book stock.

4. The process of claim 1, wherein said wastepaper contains a water-based or an oil-based ink.

5. The process of claim 1, wherein the recovering step includes air sparging in order to float ink removed from the wastepaper to the surface of the aqueous system.

6. The process of claim 1, wherein said organically modified smectite-type clay comprises the reaction product of:
   (a) a smectite-type clay having a cation exchange capacity of at least 50 milliequivalents per 100 grams of clay; and
   (b) one or more quaternary ammonium salts in an amount of from about 40% to about 200% of the cation exchange capacity of the smectite-type clay.

7. The process of claim 6, wherein said smectite-type clay is sheared prior to reaction with said quaternary ammonium salt.

8. The process of claim 1, wherein said organically modified smectite-type clay is in aqueous slurry form prior to addition to the aqueous system.

9. The process of claim 1, wherein said organically modified smectite-type clay is in dry powdered form prior to addition to the aqueous system.

10. The process of claim 1, wherein said wastepaper contains tacky contaminants.

11. The process of claim 1, wherein said agent comprises a mixture of at least one hydrophobic organically modified clay with at least one hydrophilic organically modified clay.

12. The process of claim 1, wherein said agent comprises an organically modified clay formed with a quaternary ammonium salt having both hydrophobic and hydrophilic groups.

13. The process of claim 1, wherein the recovery step includes floatation of ink removed from the wastepaper to the surface of the aqueous system.

14. The process of claim 13, wherein said agent comprises a reaction product of crude hectorite clay and methyl trihydrogenated tallow ammonium chloride.

15. The process of claim 1, wherein the recovery step includes water washing the deinked paper pulp.

16. The process of claim 15, wherein said agent comprises a reaction product of crude hectorite clay and octadecyl-methyl-ammonium chloride.

17. The process of claim 1, wherein said organically modified smectite-type clay is the reaction product of (a) a smectite-type clay selected from the group consisting of crude hectorite, crude bentonite, beneficiated hectorite, beneficiated bentonite, spray dried hectorite and mixtures thereof; and (b) one or more quaternary ammonium salts.

18. The process of claim 1, wherein the recovery step includes floatation of ink removed from the wastepaper to the surface of the aqueous system, and water washing of the deinked paper pulp.

* * * * *